United States Patent [19]

Burgess et al.

[11] Patent Number: 4,987,445
[45] Date of Patent: Jan. 22, 1991

[54] SCANNING LIGHT CONTACT DUPLICATING APPARATUS

[75] Inventors: Dennis A. Burgess, Tonka Bay; William J. Campbell, Minnetonka; Arvids Saldenais, Champlin, all of Minn.

[73] Assignee: Burgess Industries Inc., Plymouth, Minn.

[21] Appl. No.: 421,182

[22] Filed: Oct. 13, 1989

[51] Int. Cl.$^5$ .............................................. G03B 27/10
[52] U.S. Cl. ....................................... 355/84; 355/93
[58] Field of Search .................... 355/84, 91, 94, 93, 355/99, 103, 113, 102, 108, 85

[56] References Cited

U.S. PATENT DOCUMENTS

| | | | |
|---|---|---|---|
| 2,760,419 | 8/1956 | Gelb | 355/84 |
| 2,988,979 | 6/1961 | Sigler | 355/84 |
| 3,254,586 | 6/1966 | Haus | 355/84 |
| 3,479,121 | 11/1969 | Burgess | 355/85 |
| 3,644,039 | 2/1972 | Boyer | 355/85 |
| 3,685,906 | 8/1972 | Raterman | 355/103 |
| 3,723,001 | 3/1973 | Zeunen et al. | 355/84 |
| 3,777,643 | 12/1973 | Asbelle et al. | 355/84 X |
| 3,814,519 | 6/1974 | Zeunen et al. | 355/103 |
| 4,190,360 | 2/1980 | Cunningham et al. | 355/93 X |
| 4,302,103 | 11/1981 | Zeunen | 355/84 |
| 4,598,995 | 7/1986 | Rogers | 355/91 |
| 4,676,633 | 6/1987 | Burgess et al. | 355/91 |

*Primary Examiner*—Richard A. Wintercorn
*Attorney, Agent, or Firm*—James V. Harmon

[57] ABSTRACT

A scanning light contact duplicating apparatus is described which includes an exposure frame having a front and rear edge between which extends a backing plate that is used for supporting an original sheet such as a negative transparency to be copied, together with a photosensitive sheet in contact with it. A transparent cover is connected to the exposure frame. Provision is also made for pressing the transparent cover toward the backing to force the original sheet (negative) into close contact with the copy sheet (photosensitive sheet). An elongated light, usually a gas or vapor lamp, is positioned parallel to the front edge of the exposure frame. The light is supported for rectilinear movement toward the rear of the exposure frame and parallel to the plane of the exposure frame. A collimator is preferably provided between the light and the exposure frame. The collimator has a honeycomb array of parallel open-ended cells, each of the cells having walls perpendicular to the exposure frame. The collimator is supported for movement with the light whereby the alignment of the light rays that pass light through the cells of the collimator reduces undercutting on the photosensitive sheet. In some forms of the invention the exposure frame is stationary and in other forms two exposure frames are mounted back-to-back and supported for 180° of rotation so that material can be inserted into one exposure frame while graphic material is simultaneously exposed to the scanning light while in the adjacent exposure frame.

21 Claims, 6 Drawing Sheets

SCANNING LIGHT CONTACT DUPLICATING APPARATUS

FIELD OF THE INVENTION

The invention relates to contact copying in which an original sheet containing graphic information is placed in contact with a copy sheet and is then exposed to light.

BACKGROUND OF THE INVENTION

A variety of contact copiers have been previously proposed. It has been proposed for example to reproduce graphic material in a contact copying process by exposing the graphic material to a scanning light as for exampled in U.S. Pat. Nos. 3,479,121 and 3,644,039. This equipment has certain shortcomings. One shortcoming is the ability for light from the lamp to travel on an incline, e.g. from the left end of the lamp toward the right end, and to strike the sheet containing graphic information at an oblique angle so as to pass under the edge of each graphic symbol, that is to say, to undercut each symbol thereby distorting the image in the emulsion. As a result, images produced by equipment described in the aforesaid patents will be somewhat blurred. Another shortcoming is the ability to copy only a single sheet at a time.

In view of these and other deficiencies of the prior art, it is one object to improve print quality and prevent undercutting of the original graphic material. Another object is to eliminate image distortion while at the same time doubling the capacity of the device by allowing material to be loaded as other material is being exposed. A further object is to provide a very compact duplicating machine achieving the reproduction quality heretofore accomplished by placing a point source of light up to 52 inches from the exposure frame with a lamp that is no more than about 10 inches from the exposure.

These and other more detailed and specific objects of the present invention will be apparent in view of the following description setting forth by way of example but one of the various forms of the invention that will be apparent to those skilled in the art once the principles described herein are understood.

THE FIGURES

SUMMARY OF THE INVENTION

The invention provides a scanning light contact duplicating apparatus which includes an exposure frame having a front and rear edge at opposite ends of a backing plate that is used for supporting an original sheet such as a negative transparency to be copied, together with a photosensitive sheet that is placed in contact with the negative. A transparent cover is connected to the exposure frame, usually by a hinge at one edge of the exposure frame. Provision is made for pressing the transparent cover toward the backing to force the original sheet (negative) into close contact with the copy sheet (photosensitive sheet). An elongated light, usually a gas or vapor lamp, is positioned parallel to the front edge of the exposure frame. The light is supported on a guide for rectilinear movement from the front edge to the rear edge of the exposure frame and parallel to the plane of the exposure frame. A means is provided adjacent to the light for reflecting rays toward the frame. A collimator is provided between the light and the exposure frame. The collimator includes a honeycomb array of parallel open-ended cells. Each of the cells has walls that are perpendicular to the exposure frame. The collimator is supported for movement with the light. In this way the alignment of the light rays that pass from the light through the cells of the collimator reduces undercutting of the image produced on the photosensitive sheet. The movement of the collimator relative to the photosensitive sheet also prevents the formation of shadows by the collimator. In some forms of the invention the exposure frame is stationary and in other forms two exposure frames are mounted back-to-back, supported for 180° of rotation so that material to be copied can be inserted into one exposure frame while graphic material is exposed to the scanning light in the adjacent exposure frame.

DETAILED DESCRIPTION OF THE INVENTION

Figure 1:
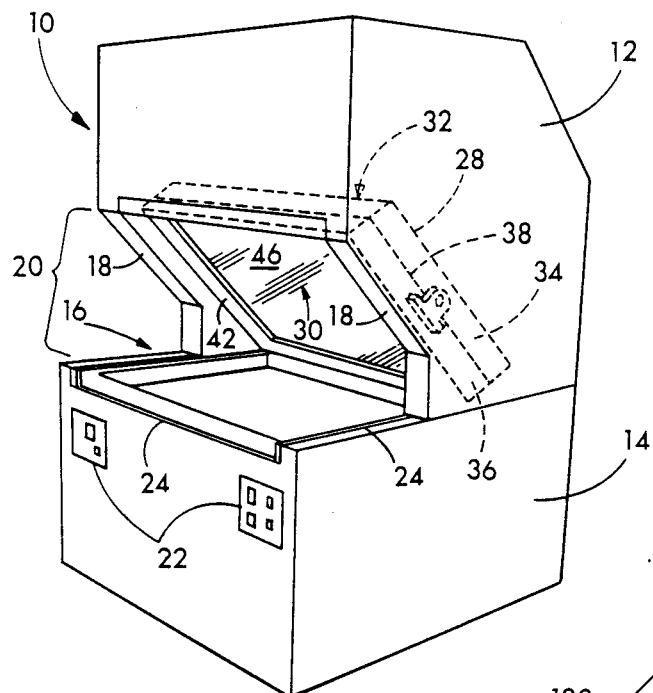
FIG. 1 is a perspective view of one form of the invention.

Refer now to the drawings and more particularly to FIG. 1-4. Shown in FIG. 1 is a scanning light contact duplicating apparatus 10 having a housing 12 with a base portion 14 that includes a stage area 16. The upper portion of the housing 12 has a centrally and downwardly inclined profile at 18 providing an open area 20 by which the operator can easily gain access to the horizontal stage area 16 at the top of the base 14. The base 14 is also provided with a pair of control panels 22 and, if desired, the stage 16 can be surrounded by a contact or proximity sensitive safety strip or bumper 24 of any suitable type known to the art which, when contacted by the hand or otherwise, will turn off the machine to prevent injury. A safety system can include other guards known to the art as desired.

Rotatably supported within the upper portion of the housing 12 upon a horizontal pivot 26 are a pair of exposure frames in back-to-back relationship indicated generally at 28 and 30. The exposure frames comprise the major faces of a casing 32 which is separated into two vacuum chambers 34 and 36, for example by a central partition 38. In each exposure frame 28, 30 is a backing plate 41 for suppporting a negative 54 and photosensitive copy sheet 56 during exposure. The exposure frames 28 and 30 are sealed along their edges so that a vacuum can be held. While any suitable exposure frame construction can be employed, a preferred exposure frame design that employs a vacuum for drawing the cover tightly against the sheet material is described in U.S. Pat. No. 4,676,633 which is incorporated herein by reference. When this vacuum frame apparatus is employed, the backing plate 41 for supporting the sheets will be the same as the sealing membrane described in the patent. The frames 28, 30 have covers 40, 42. The center portion of each cover is a glass plate 44, 48. The top cover 40 is hinged to the exposure frame at 50 and the bottom cover 42 at 52. During operation, the original tracing or negative 54 is loaded onto the cover 42 while in an open position in the stage area 16 adjacent to a photosensitive copy sheet 56 while a similar original and copy sheet in the vacuum frame 28 are exposed to light from a scanning light unit 58 mounted for rectilinear movement within the machine, in this case at a 45° angle above the vacuum frame 28 and in a plane parallel to it.

Figure 2:
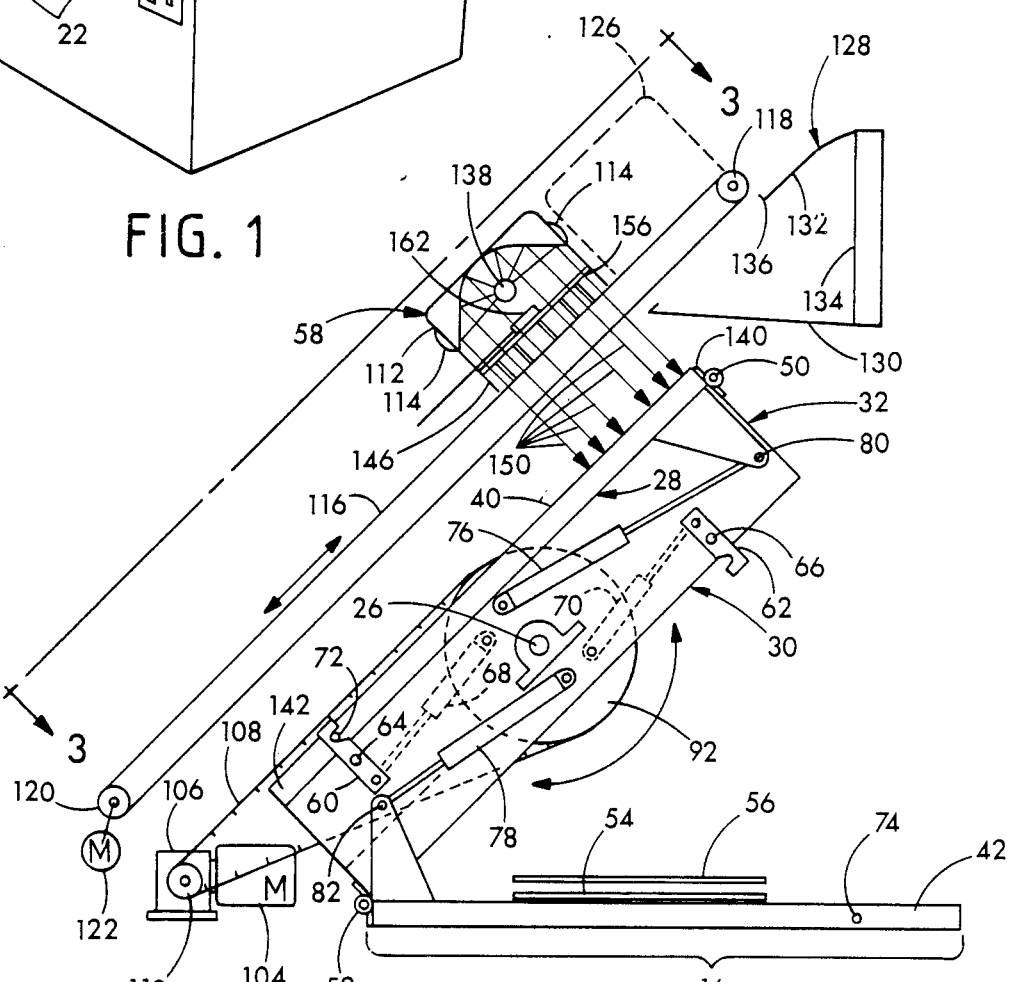
FIG. 2 is a diagrammatic partial side elevational view of the upper portion of the apparatus of FIG. 1 as seen from its left side.

The operation of the exposure frames will now be described with particular reference to FIG. 2. Each exposure frame is latched/unlatched and opened/closed by activators such as pneumatic cylinders. Specifically referring to FIG. 2, it will be seen that latches 60, 62 pivoted on pins 64, 66 and actuated by air cylinders 68, 70 engage or disengage pins 72, 74 of the covers 40, 42, thereby holding either or both of the covers in a latched position. The cover is unlatched when it is to be lowered onto the stage 16 for loading as shown in FIG. 2. The covers 40, 42 are opened/closed by means of pneumatic cylinders 76, 78 pivotally connected at their ends between the casing 32 of the vacuum frame and pivots 80, 82 connected to the covers. The timing of the operation of the cylinders 68, 70, 76, 78 is controlled by any suitable timer by means of a programmable logic controller described below.

Figure 3:
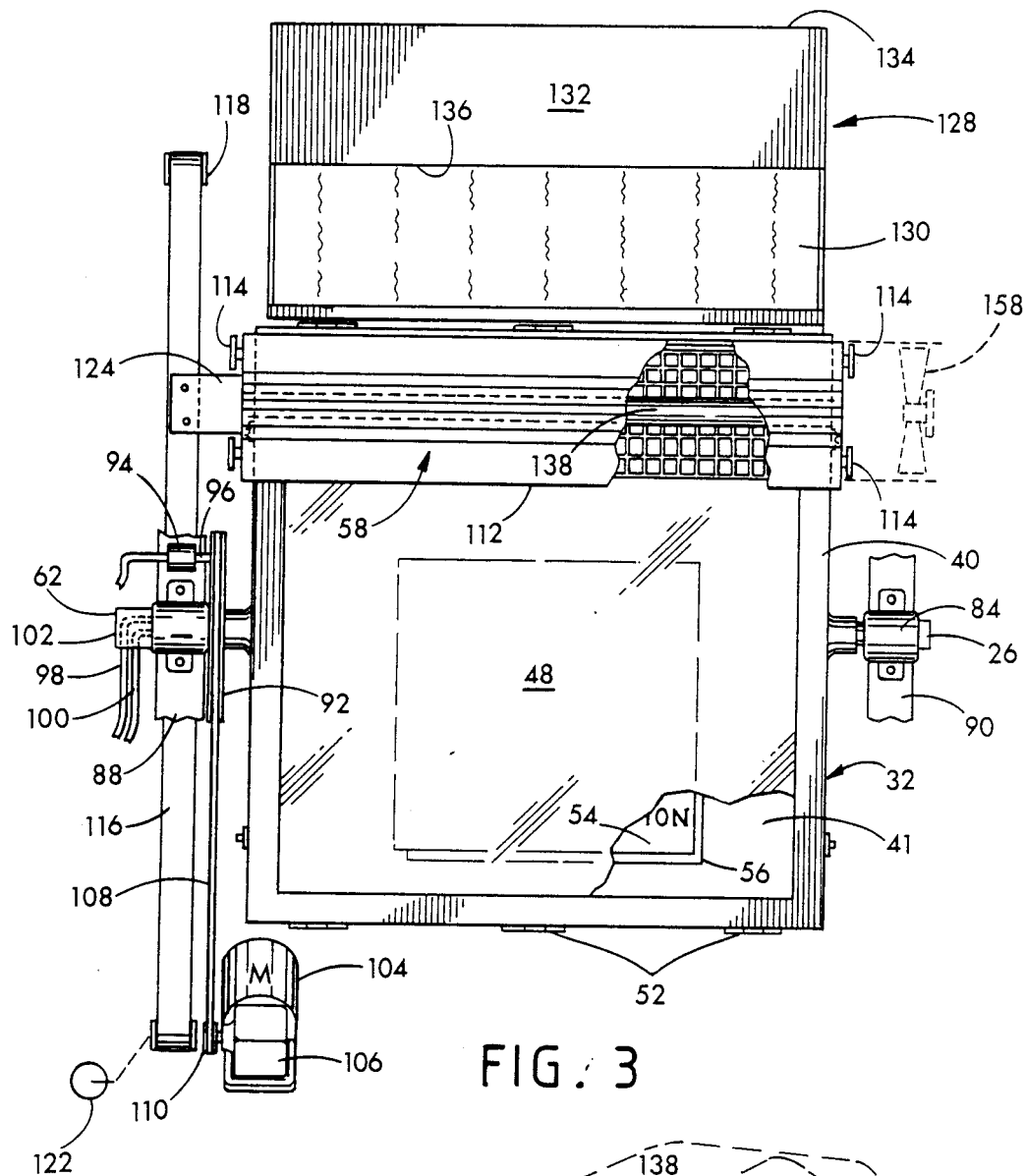
FIG. 3 is a diagrammatic plan view taken on line 3—3 of FIG. 2.

The casing 32 of the exposure frame is rotated repeatedly during operation through 180 degrees between the position shown in FIG. 2, with the stage 28 facing the light 58 or 180° from that position in which the stage 30 faces the light 58. The pivot 26 is journaled in bearings 84, 86 connected to a suitable supporting framework 88, 90 (only a portion of which is shown) within the housing 12. Connected to the pivot shaft 26 at the left side as seen in FIG. 3 is a drive pulley 92 that is held in either of the two operating positions, position A as shown in FIGS. 1 and 2 or position B, 180° from this position, by means of an air-actuated latch 94 supported on framework 88 and having a movable latch member 96 which engages the pulley 92 in one of two positions thereby locking the vacuum frame casing 32 in either position A or B. A pair of vacuum lines 98, 100 enter the vacuum frame casing through a manifold 102 and are connected, respectively, to the vacuum chambers 34 and 36. The vacuum provided in the vacuum chambers 34 and 36 functions conventionally to draw the cover 40, 42 as the case may be tightly down against the original 54 and copy sheet 56 pressing them against the backing plate 41 (FIG. 3) within each exposure frame 28, 30 to force the sheets into close contact with each other.

In this way the pneumatic actuator 94, by extending the latch 96 at the appropriate time, will function to lock the pulley 92 and hence the exposure frame casing 32 either in the position of FIG. 2 or 180° from that position. Movement is imparted to the exposure frame by means of reversible motor 104 and gear box 106 (FIG. 2). A timing belt 108 is entrained between a pulley 110 and a pulley 92. The upper exposure frame 28 or 30, whichever faces the light unit 58, will be locked in a closed position and a vacuum will be applied through one of lines 98 or 100 to press the original 54 against the copy sheet 56 while the latch for the other exposure frame on the lower side of the casing 32 is released and the corresponding cylinder retracted so that the transparent cover is lowered to the stage area 16, allowing material to be placed in the copier while material in the other exposure frame closest to the scanning light is being exposed.

Scanning light unit 58 is suitably supported for rectilinear movement in this case on a 45° angle to the horizontal and parallel with the plane of the exposure frame. The light unit 58 includes a casing 112 to which are secured support wheels 114 engaged on an inclined guide (not shown). An endless drive belt 116 entrained between pulleys 118, 120 is driven by a reversible motor 122 to impart a rectilinear scanning movement to the light unit 58 which is connected to the belt 116 by a bracket 124. While the device can be operated in various ways, it is preferred to cycle the light 58 past the exposure frame twice by moving it from an idle position 126 downwardly to the opposite end and back again to the idle position 126 to complete each exposure.

When in the idle position 126, the light unit 58 is located in vertical alignment with an energy sink 128 which includes a lower wall 130, upper wall 132, side wall 134 and an inlet opening 136 of rectangular shape and of approximately the same size as the light unit 58 to receive substantially all of the light and heat energy produced when the light unit 58 is in the idle position 126. The wall 130 can be reflective if desired, and the wall 134 can be formed from a heat absorbing or insulating material or can even be provided with cooling fins if desired. In this way the energy sink 128 will absorb most of the light and heat energy while the light unit 58 is in the idle position 126 so that the light does not have to be turned off periodically. This promotes more consistent film exposure and can enhance the life of the equipment. In some situations it can improve the cycle time of the apparatus.

Figure 4:
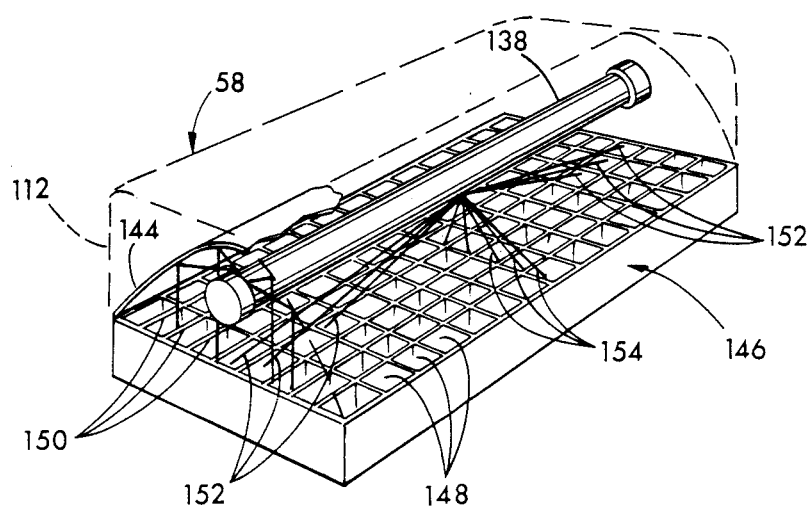
FIG. 4 is a diagram illustrating the light unit and collimator in accordance with the invention.

The light unit 58 will now be described in connection with FIGS. 2–4. Within the housing 112 is an elongated lamp 138 which is positioned parallel to the front edge 140 of the exposure frame 28 and is adapted to move during operation to the rear edge 142. Above the lamp 138 is a trough-shaped parabolic or elliptical reflector 144, the former being preferred.

Supported within the housing 112 beneath the lamp 138 is a collimator 146 having a honeycomb array of parallel open ended cells 148. Each of the cells 148 has walls 150 which are positioned perpendicular to the exposure frame 28 or 30, as the case may be. The collimator 146 is supported on the light unit 58 within the light housing 112 beneath the lamp 138 for rectilinear movement with the light unit 58 so that the rays 150 (FIG. 2) which are directed downwardly by the reflector 144 pass through the cells of the collimator, but oblique rays such as those extending longitudinally and diagonally at 152 (FIG. 4) or transversely and obliquely at 154 (FIG. 4) will be blocked. The collimator 146 can be constructed with a honeycomb-like arrangement of cells of any desired cross-sectional shape, such as circular, square or hexagonal. In the application of FIGS. 1-3, each cell can be about one inch across. In other applications, e.g. with a low powered lamp, each cell can be about one-eighth of an inch across. The height of the collimator can be about one and five-eighths inch, providing a height-to-width ratio of thirteen to one for each cell. The collimator 146 can be formed from either a light absorbent material or reflective material. Through the action of the collimator, most of the light rays reaching the material to be copied will be aligned as shown at 150 in FIG. 2. It was discovered that this is effective in reducing or eliminating the undercutting of the original graphic material and in improving resolution. In addition, the invention provides more even light coverage since a more even distribution of optical power will result when rays reaching the sheet travel the same distance. By contrast, light from a point source traveling to the edge of a sheet will travel a greater distance and contain less optical power because of the spreading effect than those at the center of the sheet. In addition, much greater speeds can be achieved than that with a point source lamp placed a substantial distance from the object.

Between the collimator 146 and the lamp 138 is a Pyrex® glass plate 156 (FIG. 1). Coupled to the light 58 is a ventilation fan shown diagrammatically at 158 for forcing air from one end of the light to the other through the housing 112 and around the lamp 138 to remove waste heat and prevent overheating. The warm air will then be exhausted from the opposite end of the casing 112. The fan 158 in this way force-cools the lamp 138 by drawing or blowing air through the length of the lamp and allowing the warm air to be exhausted from the other end.

Various lamps 138 can be employed. One suitable lamp is a 2-inch diameter mercury vapor lamp doped with iron, such as a Hanovia model HC703D05, Newark, N.J. For smaller scale applications, a 115–200 watt tubular ultraviolet lamp of about 325–425 nm can be used. The spectral output and wattage level of the lamp selected should be matched with the sensitivity range of the photosensitive sheet employed.

Figure 9:
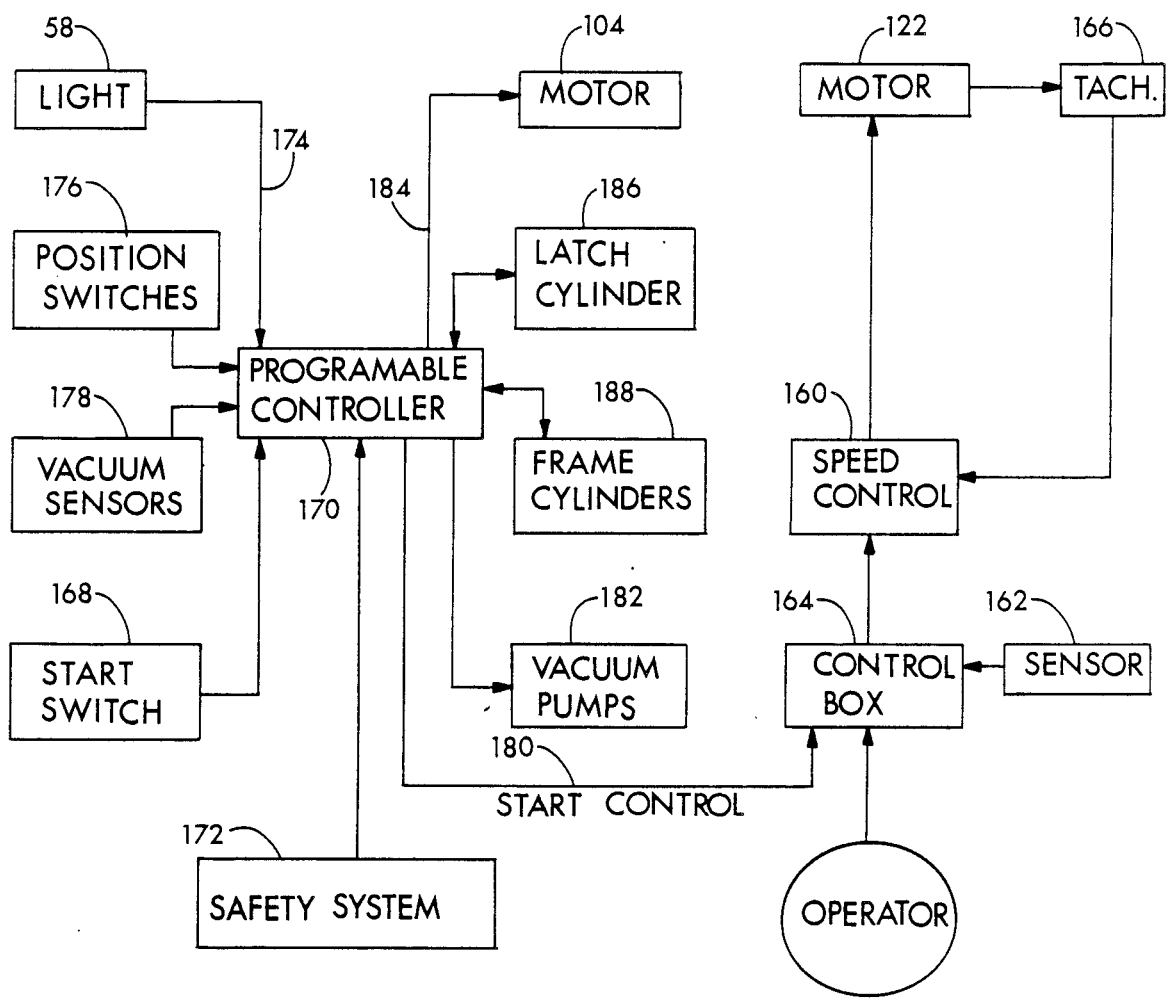
FIG. 9 is a schematic diagram illustrating one suitable form of control that can be employed in connection with the embodiment of FIGS. 1-4.

The exposure control and operation will now be described by reference to FIGS. 2, 3 and 9. Motor 122 is a variable speed motor which during operation is controlled by a speed control 160 as shown in FIG. 9. Positioned within the light 58 to receive rays from the lamp 138 is a sensor 162, such as a photo cell sensitive to light at the wavelength of lamp 138, connected through control box 164 to the speed control 160. The photo cell or sensor 162 is filtered to receive only those wavelengths to which the photosensitive sheet is sensitive. The photo cell 162 in this way delivers a signal to the speed control 160 which serves as a light integrator, translating this signal into a motor speed value for the motor 122. The motor speed can be set by means of the control box 164 to be varied from one photosensitive material to another by the operator so that the motor speed matches the sensitivity of the plate. The speed control 160 also receives information from a tachometer 166 which provides an indication of how fast the light unit 58 is actually moving, thereby allowing the speed control to make adjustments accordingly and to correct the speed if necessary.

The operation of the apparatus is initiated by closing a start switch 168 which sends an impulse to a programmable controller 170. Provided that the safety system 172 is not energized and the machine is safe to operate, the light unit 58 position will be sensed as at 174 as will the condition of suitable position switches 176 and vacuum sensors 178. This will then allow the programmable controller 170 to send a starting control impulse at 180 to the control box 164 and to operate each of the vacuum pumps 182 as required. Signals will also be sent as shown at 184 to motor 104 as well as the latch cylinders at 186 and the frame cylinders at 188 when the exposure frame is in the proper position. The apparatus can be provided with other suitable safety and position switches as desired to prevent, for example, the operation of the motor 104 when one of the covers 40, 42 is open. Other safety locking devices can be provided for the vacuum frame structure, e.g. to prevent movement of the light unit 58 unless the exposure frame is properly positioned and the proper level of vacuum has been reached within the upper chamber 34. Movement of the motor 104 will not be permitted if the safety strip 24 is energized.

Figure 5:
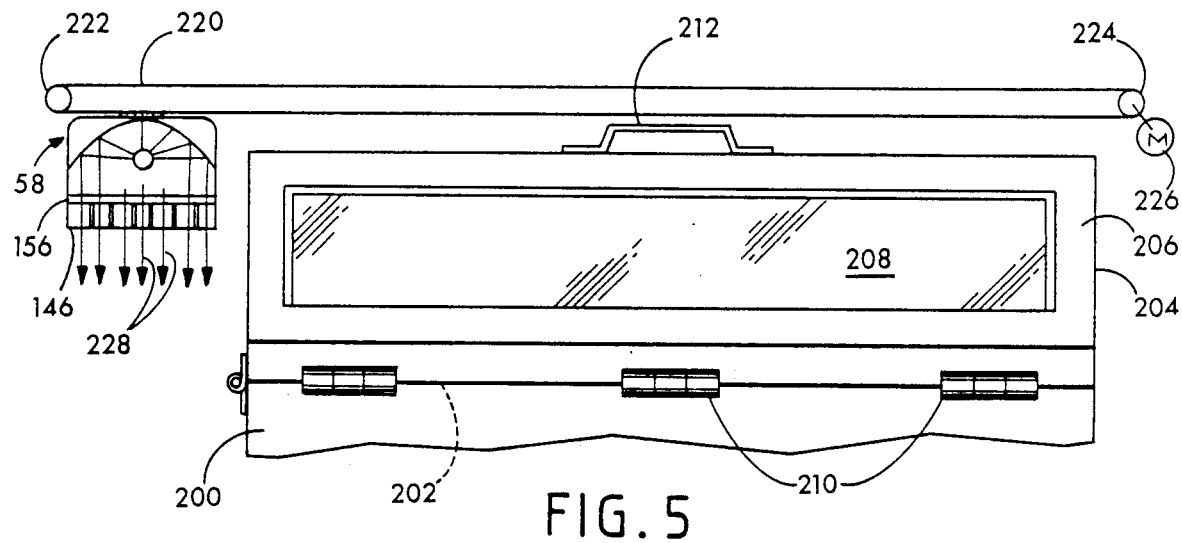
FIG. 5 is a partial side elevational view of another form of the invention.
Figure 6:
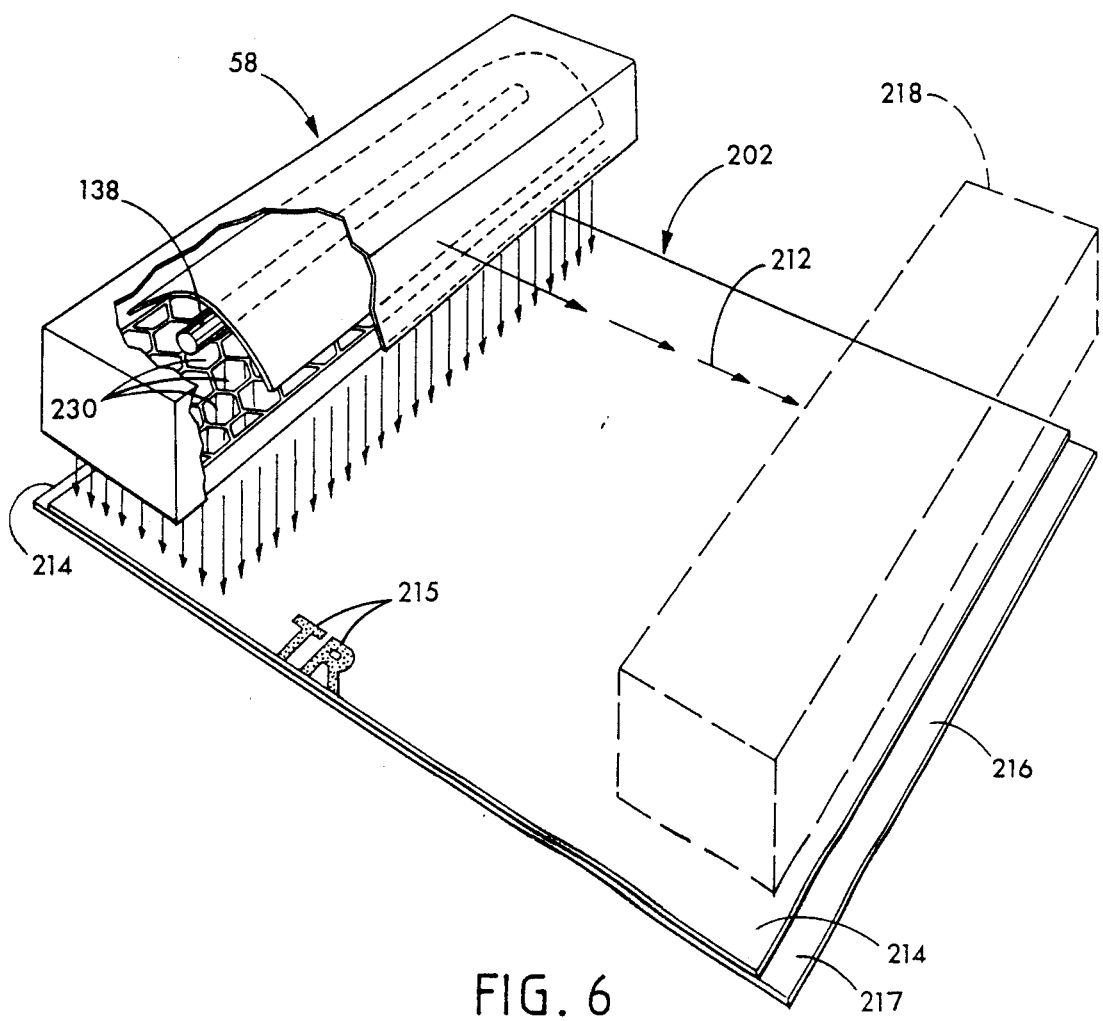
FIG. 6 is a diagrammatic perspective view to illustrate the principle of operation.

Refer now to FIGS. 5 and 6 which illustrate another embodiment of the invention, in this case a contact copier having a base 200 adapated to rest on the floor with a horizontal exposure frame 202 across the top surface of the base 200. The exposure frame includes a cover 204 having a casing 206 at its edge and a transparent glass plate 208 at its center. Cover 204 is hinged to the base 200 at 210 and can be raised by means of a handle 212 and locked in position by means of a latch (not shown) similar to that described in FIGS. 1-3 or manually operated to press the original tracing or other original sheet material 213 containing graphic information 215 contact with the photosensitive sheet material 217. Suitably supported for rectilinear movement along a horizontal axis parallel to the exposure frame 202 is a light unit 58 in all respects similar to that described in connection with FIGS. 1-4 and adapted to travel horizontally along a path 212 above the exposure frame from its front edge 214 to its rear edge 216. The light unit 58 is suitably supported at both ends for sliding movement on a horizontal guide (not shown). It will be noted that the lamp 138 is positioned parallel to the front edge of the exposure frame 202 and moves in a direction perpendicular to its own axis to an alternate position 218 at the opposite end of the sheet material. The light unit 58 is connected in this case to an endless drive belt 220 which is entrained over pulleys 222, 224 and is driven by means of a reversible motor 226 similar to the motor 122. The light in this case passes downwardly through the cellular openings of the collimator 146 as shown at 228 after the cover 204 has been closed and passes through the glass plate 208 of the cover onto the sheet material resting on the exposure frame 202. The cells 230 are in this case hexagonal in shape and they typically have a cross-section of about one-fourth inch across. The motor 226 is operated to move the light unit first to the right and then to the left, making two passes across the exposure frame to complete an exposure. The cover 204 is then raised to remove the sheet material. Equipment of the type described in FIGS. 5 and 6 is particularly well suited for retrofitting existing contact copiers which open from the top.

Figure 7:
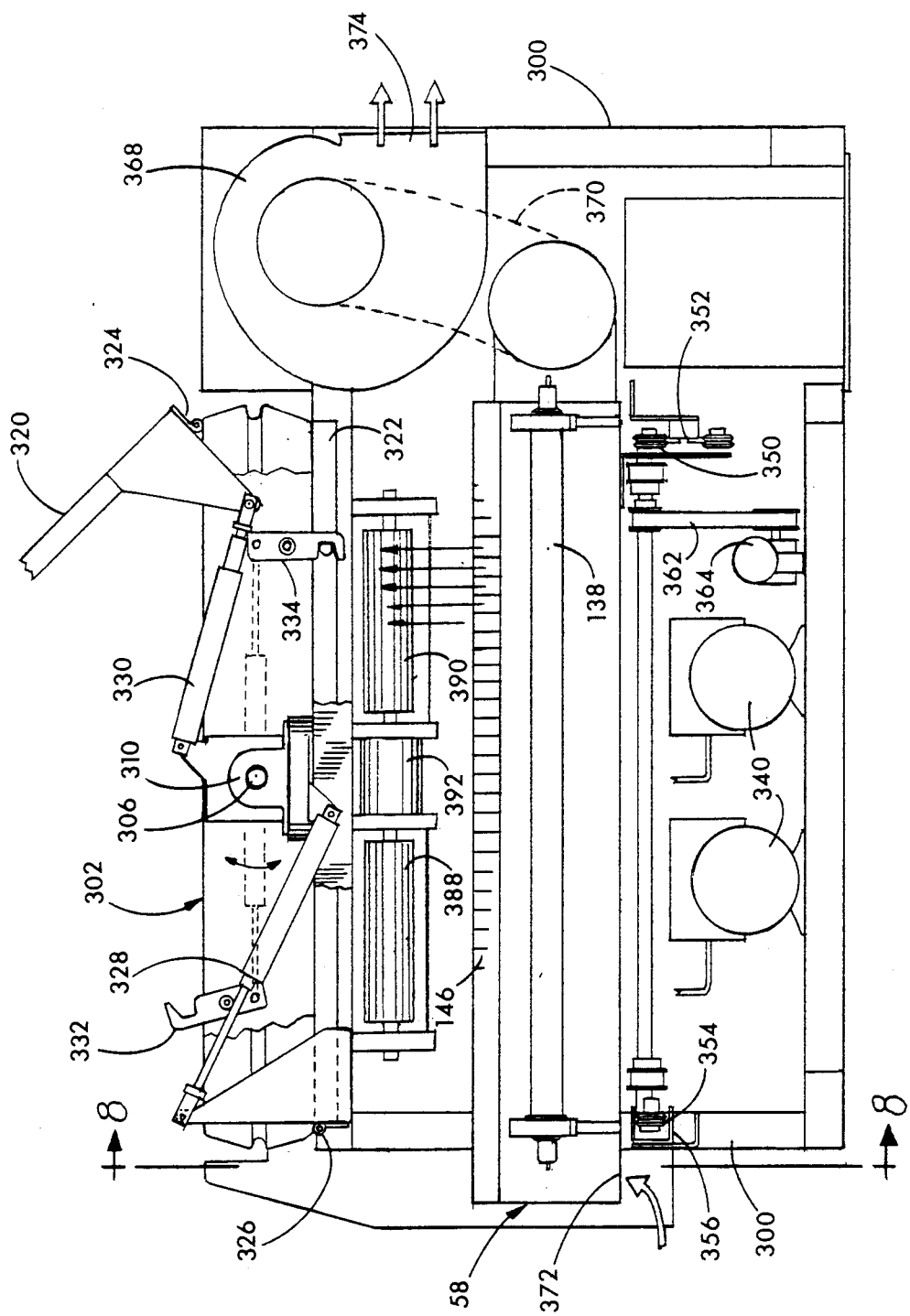
FIG. 7 is a side elevational view of another form of the invention.
Figure 8:
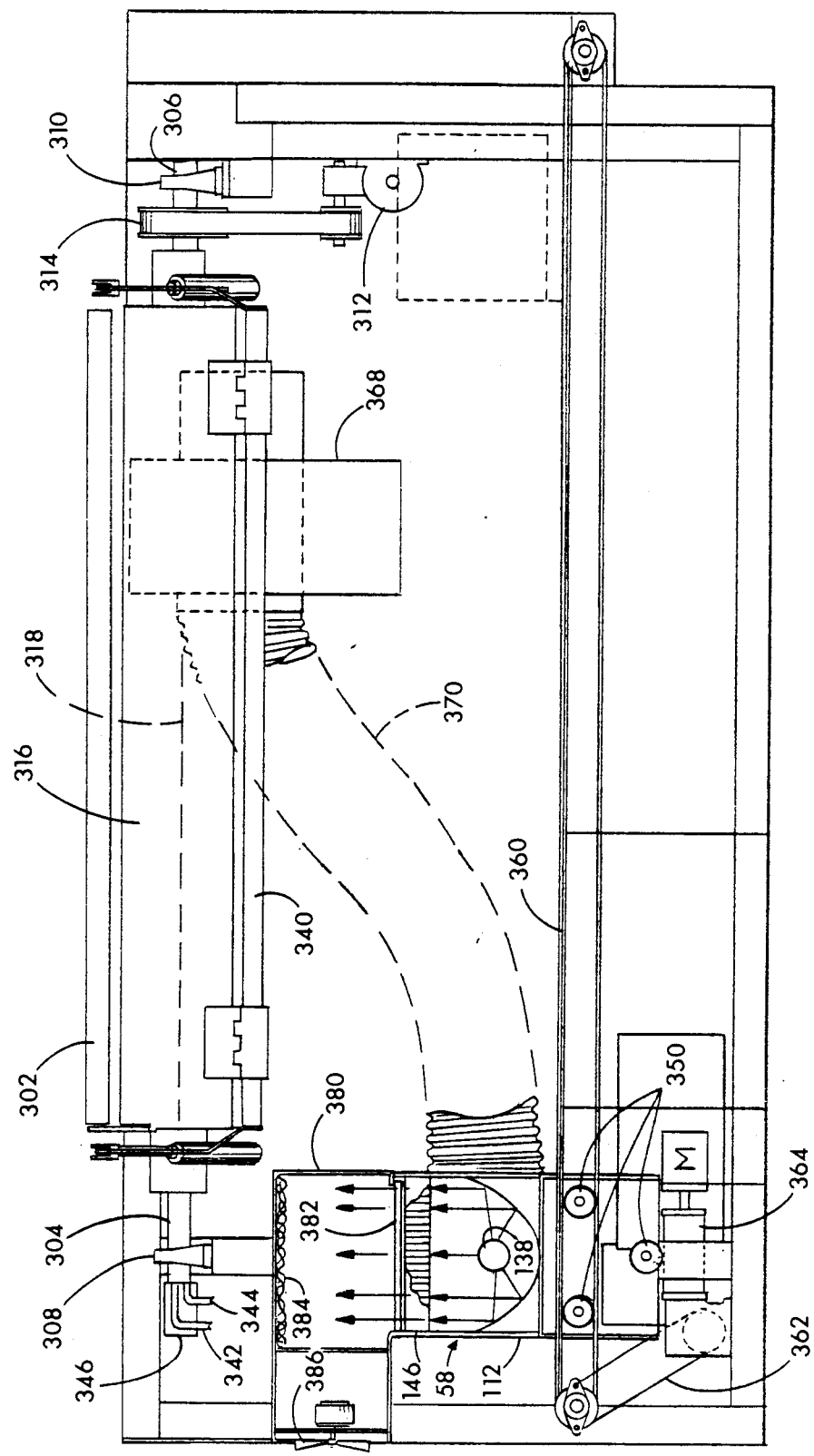
FIG. 8 is a vertical sectional view taken on line 8—8 of FIG. 7.

Refer now to FIGS. 7 and 8 which illustrate another form of the invention.

The apparatus of FIGS. 7 and 8 includes a supporting framework 300 having a light unit 58 mounted generally in the center of the apparatus and back-to-back upper and lower exposure frames in a casing 302 that is exposed to view at the top and mounted by means of pivots 304, 306 that are in turn supported on bearings 308, 310 for pivotal movement about a horizontal axis between the position shown in FIG. 1 and a position with its lower side facing upwardly, i.e. 180° from the position shown. Rotation of the vacuum frame casing 302 is accomplished by means of a reversible gear motor 312 coupled to the pivot 306 by means of a timing belt and pulley assembly 314. The exposure frame includes a casing 316 which can be divided into upper and lower vacuum frames, as for example by means of a partition 318, to provide an upper vacuum frame chamber and a lower vacuum chamber, each with a backing plate as already described to support sheet material to be copied and covered during operation by means of doors 320, 322 hinged to the exposure frames at 324 and 326, respectively, and opened at the appropriate time by means of a suitable actuator such as one of two air cylinders 328, 330 which operate in the same manner as described in connection with FIGS. 1-4 for opening and closing the transparent covers. When the covers are closed, they are locked in the closed position by means of latches 332, 334 in the same manner as described in connection with FIGS. 1-3. At the appropriate time, vacuum provided by one of two vacuum pumps 340 is admitted to the interior of the exposure frame through one of vacuum lines 342, 344 connected through a manifold 346 to the interior of the exposure frame.

The light unit 58, which is in all respects similar to that described in FIGS. 1-3 except for its position, directs light upwardly through the collimator 146 onto the lower exposure frame 340. The light unit 58 is in this case supported for rectilinear movement along a horizontal axis by means of support wheels 350 engaged on a track 352 (FIG. 7) and wheels 354 engaged in a track 356. Movement is imparted to the light unit 58 through its connection to a drive belt and pulley assembly 360 which is in turn driven by means of a timing belt 362 coupled to a gear motor assembly 364. The housing 112 of the light unit 58 is connected to a centrifugal blower 368 which draws air through a flexible hose 370 coupled to the housing 112, thereby drawing cool air into an inlet 372 past the lamp 138 and expelling the hot air to the atmosphere at 374.

During operation, the operator or a suitable control unit energizes the actuator 330 to open the cover 320, allowing graphic material and the photosensitive sheet to be placed in the upper exposure frame. At the same time the lower cover 322 is locked in the closed position by latch 334 and vacuum is applied within the space containing the graphic material beneath the cover 322. The light unit 58 is then advanced horizontally from the solid line position shown in FIG. 8 to the dotted line position, directing light upwardly into the downwardly facing exposure frame. After the material is placed in the top unit, the cover 320 is closed and latched. By this time the light unit 58 will have made two passes, thereby exposing the film, and will come to rest in the solid line position (FIG. 8) beneath an energy sink 380. The energy sink includes side, top and bottom walls and an inlet opening 382 to allow light and heat energy to enter. The energy sink 380 can be provided if desired with energy absorbent material 384 at its top surface and with an exhaust fan 386 for expelling hot air. Additional heat can be removed by the provision of two squirrel cage blowers 388, 390 (FIG. 7) supported on the framework 300 and driven by means of a motor 392 for blowing air across the lower surface of the lower exposure frame unit for additional cooling. Safety and operating controls are provided of the same type described in connection with FIGS. 1-3. This will assure that the exposure frame is not rotated while one of the covers is open, the light is in the way or when an operator is touching the apparatus.

It can be seen that the invention provides a number of important advantages. Resolution is improved because of the columnated condition of the light. This makes possible more accurate reproduction of the graphic information without undercutting. Speed is improved because of the close positioning of the light source compared with exposure from a point source 32 to 52 inches away, which is a current practice in the industry. The invention also provides more even coverage over the entire surface of the material being copied because there is no spreading effect of the type encountered when a point source of light is used.

Many variations of the present invention within the scope of the appended claims will be apparent to those skilled in the art once the principles described herein are understood.

What is claimed is:

1. A scanning light contact duplicating apparatus comprising, an exposure frame having a front and rear edge and a backing plate for supporting an original sheet to be copied with a photosensitive sheet in contact therewith, a transparent cover connected to the exposure frame, means for pressing the transparent cover toward the backing to force the sheets into close contact with each other, an elongated scanning light positioned parallel to the front edge of the exposure frame, the light being supported for movement toward the rear edge of the exposure frame and parallel to the plane of the exposure frame, means adjacent the light to reflect light toward the frame, a collimator between the light and the exposure frame, said collimator having a honeycomb array of parallel open-ended cells, each of the cells having walls perpendicular to the plane of the exposure frame, the collimator being supported for movement with the light whereby the alignment of light rays that pass from the light through the cells of the collimator reduce undercutting of the image produced on the photosensitive sheet and the movement of the collimator relative to the photosensitive sheet prevents the formation of shadows by the collimator.

2. The apparatus of claim 1 wherein two exposure frames are provided in back-to-back relationship on a pivotally mounted casing, drive means is connected to the casing for rotating the casing through an arc of 180° and means for retaining the casing in either one of two positions 180° apart whereby each exposure frame is successively positioned to face the scanning light and in a plane parallel to the path of movement of the light.

3. The apparatus of claim 2 wherein each of the exposure frames has a cover, each cover is hinged to the casing and actuator means is operatively connected to each cover for opening and closing the cover.

4. The apparatus of claim 3 wherein a latch means is provided for each cover to lock the cover and actuator means is connected to each latch for opening and closing the latch.

5. The apparatus of claim 1 wherein the light is mounted for sliding movement upon a guide track, a drive belt assembly is mounted upon the apparatus adjacent to the track, reversible drive motor means is connected to the drive belt assembly for advancing the drive belt in forward and reverse directions, and speed control means is operatively connected to the motor for controlling the speed of the motor.

6. The apparatus of claim 5 wherein a photocell is connected to receive energy from the light, and the photocell is connected to the speed control for increasing the speed of the motor when more light is sensed and decreasing the speed of the motor when less light reaches the photocell.

7. The apparatus of claim 2 wherein the exposure frame casing is normally positioned at a 45° angle to the horizontal above an access opening in said apparatus and a horizontal stage is provided below the access opening, said exposure frame casing includes upper and lower exposure frames, the lower exposure frame is hinged at the rear of the casing whereby the cover of the lower exposure frame can be lowered to a horizontal position for uploading of photosensitive sheet material thereon.

8. The apparatus of claim 2 wherein a first drive motor is operatively associated with the light for moving the light from one end of the exposure frame to the other to expose the sheet material, a second drive motor is operatively connected to the casing of the exposure frame for rotating the exposure frame through 180°, actuator means is operatively connected to a cover for each exposure frame to open and close the cover and a releasable latch is operatively connected to each of the covers for locking the cover in a closed position.

9. A scanning light contact duplicating apparatus comprising, an exposure frame having a front and rear edge and a backing plate for supporting an original sheet to be copied with a photosensitive sheet in contact therewith, a transparent cover connected to the exposure frame, means for pressing the transparent cover toward the backing to force the sheets into close contact with each other, an elongated scanning light positioned parallel to the front edge of the exposure frame, the light being supported for movement toward the rear edge of the exposure frame and parallel to the plane of the exposure frame, means adjacent the light to reflect light toward the frame, drive means operatively associated with the light for advancing the light between the front and rear edge of the exposure frame, a photosensor connected to receive energy from the light, means connecting the photosensor to the speed control for increasing the speed of the drive means when greater energy is sensed and for reducing the speed when the light produces less energy to thereby enhance uniformity of exposure of said sheet material.

10. The apparatus of claim 9 wherein speed sensing means is connected to sense the speed of movement of the light and the speed sensing means is connected to the speed controller to regulate the speed controller for advancing the light along said path at a predetermined speed to assist in correctly exposing the photosensitive sheet material.

11. The apparatus of claim 2 wherein the exposure frame casing is normally positioned horizontally, the exposure frame is accessible from above the apparatus when the exposure frame is in a horizontal position, upper and lower exposure frames are provided, the upper exposure frame has a cover hinged at the rear thereof whereby the cover of the upper exposure frame can be raised from to a horizontal position for loading of photosensitive sheet material.

12. The apparatus of claim 2 wherein the light is mounted for movement within the apparatus below the casing of the exposure frame, the casing is mounted for rotation upon a horizontal axis between two positions wherein each of the exposure frames is successively in a horizontal position facing upwardly and the light is positioned beneath the casing for rectilinear movement along a horizontal path, and a lamp within the light unit is oriented to direct rays of light upwardly onto each successive the downwardly facing exposure frame while an upwardly facing exposure frame on the opposite side of the casing is opened to remove and replace original and copy sheet material therefrom.

13. The apparatus of claim 1 wherein the cover of the exposure frame is connected to said apparatus for pivotal movement along a horizontal axis wherein an edge opposite said hinge can be raised and lowered to provide a downloading copier and said light is positioned to move along a horizontal path above the cover when the cover is closed whereby the light directs light rays downwardly onto the exposure frame from above as it is advanced horizontally from one edge of the exposure frame to the other.

14. The apparatus of claim 1 wherein the collimator has openings about an inch across and the collimator is about one and one-half inches deep.

15. The apparatus of claim 1 wherein the collimator contains cells about an inch in height and about a quarter of an inch across.

16. The apparatus of claim 1 wherein guide means is provided for permitting the light to move beyond the exposure frame to an idle station and an energy sink is positioned adjacent to the light when in the idle station, said energy sink comprising side, front and rear walls and an inlet opening positioned to receive light and heat energy from the light when the light is in the idle station.

17. The apparatus of claim 16 wherein the energy sink has an exhaust fan connected thereto for exhausting hot air therefrom.

18. The apparatus of claim 1 wherein the light includes a casing having a lamp therein and a sheet of transparent material is positioned within the casing of the light adjacent to said collimator and a fan means is connected to the casing for forcing air through the casing to cool the light.

19. A scanning light contact duplicating apparatus comprising, an exposure frame having a source of vacuum connected thereto, a removable cover connected to the exposure frame for enclosing sheet material to be copied onto a photosensitive sheet in contact therewith within the exposure frame, a scanning light unit mounted for movement along a path parallel to the plane of the exposure frame for directing light onto the exposure frame, a collimator including a multiplicity of open-ended cells between the exposure frame and the light unit, said collimator being mounted upon the light unit for movement therewith whereby the parallel light rays passing from the light unit through the cells of the collimator improve resolution by enhancing accurate reproduction of the original onto the photosensitive sheet and provide substantially even coverage from one edge of the exposure frame to the other.

20. The apparatus of claim 19 wherein drive means is operatively connected to the light unit for advancing the light unit along said path and a speed control means is operatively associated with the drive unit for controlling the speed thereof, speed sensing means is connected to the drive unit for sensing the speed thereof, and the speed sensing means is connected to the speed control for maintaining a predetermined speed.

21. The apparatus of claim 20 wherein photosensor means is connected to receive light from the light unit and said photosensor means is operatively connected to the speed control for increasing the speed when the light output of the light unit increases to maintain uniformity of exposure.

* * * * *